United States Patent Office 3,605,906
Patented Sept. 20, 1971

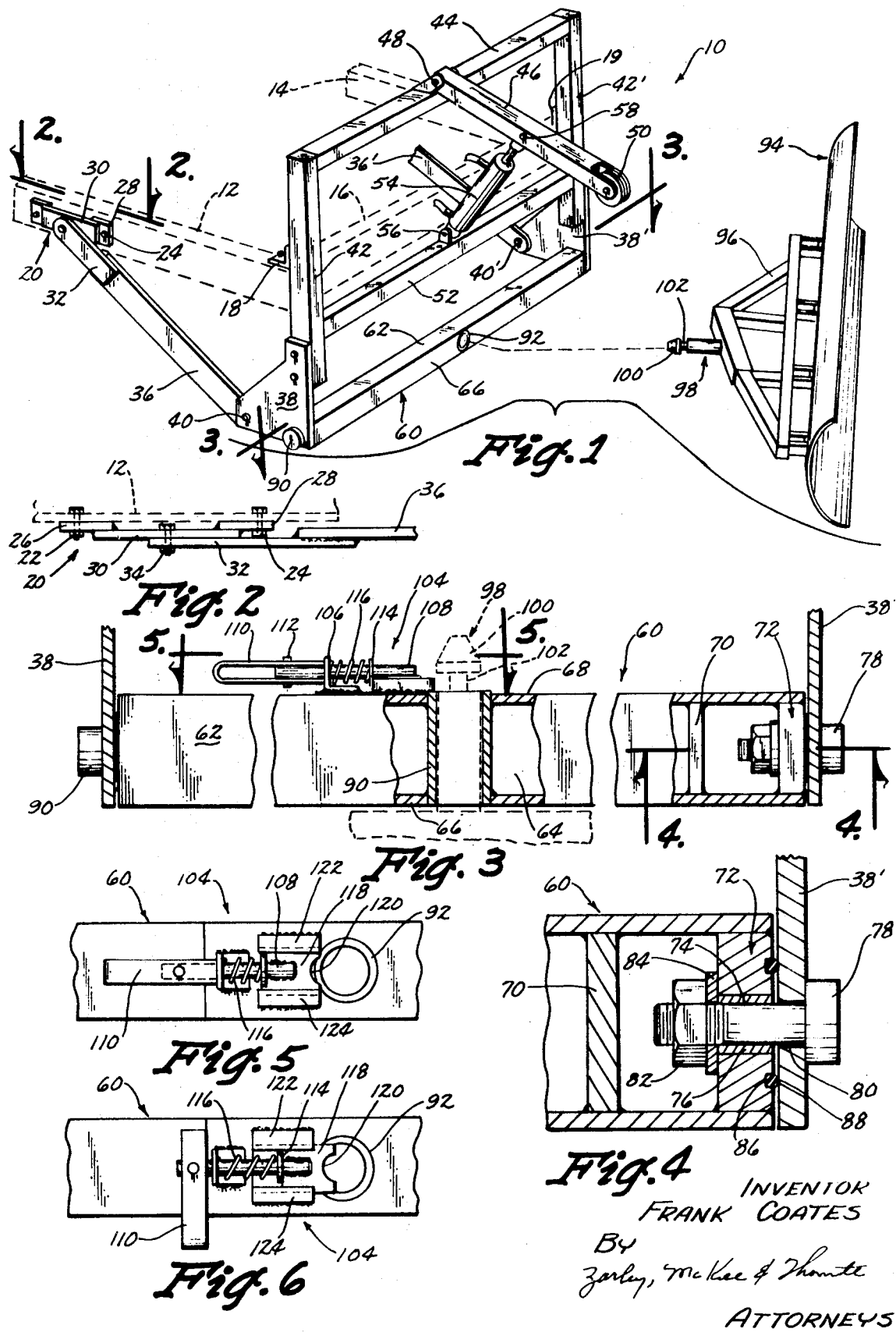

3,605,906
SNOWPLOW WITH MEANS TO FACILITATE MOUNTING
Frank Coates, Corydon, Iowa, assignor to Coates Manufacturing Co., Corydon, Iowa
Filed Mar. 28, 1969, Ser. No. 811,305
Int. Cl. E01h 5/06; E02f 3/76
U.S. Cl. 172—272     6 Claims

ABSTRACT OF THE DISCLOSURE

A snowplow for attachment to the forward end of a vehicle such as a truck or the like. The snowplow includes a pair of spaced apart push arms which are secured at their rearward ends to the vehicle frame and which extend forwardly therefrom. A cross beam means is secured to and extends between the forward ends of the push arms and has a hollow tube provided thereon adapted to rotatably receive a pivot shaft. The pivot shaft extends rearwardly from the blade portion of the snowplow and is removably received by the tube to effect a pivotal or rotational connection between the cross frame means and the blade structure. A locking means is provided for detachably maintaining the pivot shaft in the tube. A lift arm assembly is connected to the cross beam means and the blade structure for raising and lowering the blade structure with respect to the cross beam means. The pivot shaft tube is mounted on a cross beam member which is rotatable about a horizontal axis and means is provided for yieldably preventing the rotational movement of the cross beam member during the periods when the blade structure is removed from the cross beam means to facilitate the subsequent attachment of the blade structure to the cross beam means.

---

Conventional snowplows which are designed for use with trucks or the like have several shortcomings. The conventional snowplows are difficult to attach to the vehicle and are complicated in design due to the many pivots and pins utilized thereon. Further, the conventional snowplows do not automatically follow the contour of the road which results in an inefficient snow removal operation as well as causing damage to the structure at times. Additionally, these snowplows are not mounted on the vehicle in such a manner so as to provide a durable connection therebetween.

Therefore, it is a principal object of this invention to provide a snowplow for use with a truck or the like.

A further object of this invention is to provide a snowplow which is quickly attached to a vehicle.

A further object of this invention is to provide a vehicle snowplow which automatically follows the contour of the road.

A further object of this invention is to provide a vehicle snowplow wherein the blade structure is pivoted about a longitudinal horizontal axis with respect to the vehicle.

A further object of this invention is to provide a vehicle snowplow which is of rigid construction.

A further object of this invention is to provide a vehicle snowplow wherein a pair of push arms are secured to the vehicle frame in such a manner to spread the stress imposed therein over a large area.

A further object of this invention is to provide a vehicle snowplow including a pivotal cross beam and means for yieldably maintaining the cross beam in a predetermined position during periods that the blade structure is not attached to the vehicle.

A further object of this invention is to provide a vehicle snowplow which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a partial exploded front perspective view of the snowplow of this invention;

FIG. 2 is an enlarged view as seen along lines 2—2 of FIG. 1;

FIG. 3 is an enlarged fragmentary sectional view as seen along lines 3—3 of FIG. 1;

FIG. 4 is an enlarged sectional view as seen along lines 4—4 of FIG. 3;

FIG. 5 is a rear view of the locking means utilized in this invention, the locking means being illustrated in an unlocked position; and FIG. 6 is a view similar to FIG. 5 except that the locking means is illustrated in a locked position.

The snowplow of this invention is generally designated by the reference numeral while the reference numerals 12 and 14 generally refer to a pair of spaced apart longitudinal frame members commonly found on vehicles such as trucks or the like. The vehicle has not been shown for purposes of clarity. The numeral 16 refers to a frame member extending between the forward end of the frame members 12 and 14 and it is to the frame member 16 that the vehicle front bumper is commonly attached. In some instances, it may or may not be desirable to remove the front bumper from the vehicle while in other instances it may be desirable to attach the frame angles 18 and 19 to the front bumper.

A push arm bracket 20 is secured to frame member 12 by means of bolts 22 and 24 extending through plates 26 and 28 respectively and through the frame member 12. A plate 30 is secured to the plates 26 and 28 and extends therebetween as best illustrated in FIG. 2. A push arm 32 is secured to plate 30 by means of bolt 34 extending therethrough as also illustrated in FIG. 2. A push arm 36 is secured to the forward end of push arms 32 by welding or the like and extends forwardly and downwardly therefrom in a manner illustrated in FIG. 1. A push arm bracket corresponding to bracket 20 would be secured to frame member 14 while a push arm corresponding to push arm 32 would be secured to the push arm bracket of frame member 14. The numeral 36′ refers to a push arm corresponding to push arm 36.

The forward end of push arm 36 is secured to a side plate 38 by a bolt means 40 while a side plate 38′ is secured to the forward end of push arm 36′ by a bolt means 40′. Supports 42 and 42′ are secured to side plates 38 and 38′. respectively by any convenient means such as by bolts or the like and extend upwardly therefrom as illustrated in FIG. 1. Beam 44 is secured to the upper ends of supports 42 and 42′ by any convenient means such as welding or the like and extends horizontally therebetween. Lift arm 46 is pivotally connected at its rearward end to beam 44 at 48 and extends forwardly and downwardly therefrom. A sheave 50 is rotatably mounted on the forward end of the lift arm 46 and is adapted to accommodate a cable or chain extending therearound. Beam 52 is secured to supports 42 and 42' by welding or the like and extends therebetween at a position below beam 44. A hydraulic cylinder 54 is pivotally connected at its lower end to beam 52 at 56 and is pivotally connected at its piston rod end to the lift arm 46 at 58. The frame angles 18 and 20 are secured to the rearward sides of the supports 42 and 42' respectively and would be secured to the frame members 12 and 14 respectively or would be secured to the frame member 16 or to the front bumper by any convenient means such as bolts or the like.

The numeral 60 refers to a cross beam which is rotatably connected to the side plates 38 and 38' and extends therebetween. Cross beam 60 includes a top 62, bottom 64, front 66 and back 68. The cross beam 60 is formed of steel plates welded together so that the interior of the beam 60 is hollow. The bottom plate forming bottom 64 has a length less than the plate forming top 62 so as to provide an open area in the bottom adjacent the opposite ends thereof. As seen in FIG. 3, a plate 70 is welded to and extends between front 66 and back 68. Bottom 64 is open outwardly of the plate 70. The structure at the opposite end of beam 60 is identical to that seen in the right hand portion of FIG. 3 and also seen in FIG. 4. Plate 72 is welded to one end of beam 60 as illustrated in FIGS. 3 and 4 and has an opening 74 extending therethrough which is provided with a bushing 76 mounted therein. As seen in FIG. 4, a bolt 78 extends through opening 80 in side plate 38' and through the bushing 74. Bolt 78 is maintained therein by a nut 82 threadably mounted thereon and having a washer element 84 mounted thereon. Nut 84 may be tightened by extending a wrench upwardly through the opening formed at one end of the bottom 64. As seen in FIG. 4, plate 72 is provided with an annular groove 86 formed therein having a resilient O-ring 88 mounted therein and extending outwardly therefrom. The tightening of nut 82 on bolt 78 causes the O-ring 88 to be compressed between the outside surface of plate 72 and the inside surface of side plate 38'. The engagement of the O-ring 88 and the inside surface of side plate 38' yieldably resists the rotational movement of the cross beam 60 with respect to the side plate 38 to maintain the cross beam 60 in position when the blade structure has been detached therefrom. A bolt 90 extends through side plate 38 and into the other end of cross beam 60 and it should be understood that an O-ring is positioned between side plate 38 and the end of cross beam 60 which would function identically to the O-ring 88. A tube 92 extends through cross beam 60 and the axis thereof is transversed to the longitudinal axis of the cross beam 60.

The numeral 94 generally refers to a blade structure having a rearwardly extending frame means 96. A pivot shaft 98 is secured to frame means 96 and extends rearwardly therefrom as illustrated in FIG. 1. Pivot shaft 98 is provided with a tapered portion 100 at its rearward end and is provided with an annular groove 102 formed therein forwardly of the rearward end thereof. Pivot shaft 98 is adapted to be received by the tube 92 in the manner illustrated in FIG. 3 so that the groove 102 would be positioned rearwardly of back 68 of cross beam 60. The tapered portion 100 aids in the pivot shaft 98 being received by the tube 92.

A locking means is provided on the back side of the cross beam 60 and is generally referred to by the reference numeral 104. Angle 106 is welded to back 68 laterally of tube 92 and has a pin 108 slidably extending therethrough as illustrated in FIGS. 3, 5 and 6. A U-shaped head portion 110 is pivotally secured to the outer end of pin 108 by a pin element 112 extending therethrough. Head portion 110 is pivotally movable from the position illustrated in FIG. 6 to the position illustrated in FIG. 5 and vice versa. Washer 114 is mounted on pin 108 inwardly of angle 106 and is secured thereto by welding or the like. Coil spring 116 embraces pin 108 between angle 106 and washer 114 and normally urges pin 108 inwardly towards tube 92 or to the right as viewed in FIG. 3. A slide 118 is secuerd to washer 114 by welding or the like and it can also be seen in FIGS. 5 and 6 that the pin 108 is also welded to the slide 118. Slide 118 is provided with a semi-circular notch 120 formed in one end thereof as illustrated in FIGS. 5 and 6. Slide 118 is slidably mounted between a pair of guides 122 and 124 welded to back 68. When head portion 110 is pivoted so as to be parallel with the longitudinal axis of pin 108 (FIG. 5) pin 108 and slide 118 is moved to the left away from tube 92. When head portion 110 is pivoted to the position seen in FIG. 6, spring 116 urges pin 108 and slide 118 to the right towards tube 92 as viewed in FIG. 6. Notch 120 in slide 118 is adapted to extend into the groove 102 in pivot shaft 98 when pivot shaft 98 is received by tube 92 to selectively lock the blade structure to the cross beam 60 while still permitting the blade structure 94 to rotate about the axis of pivot shaft 98 in tube 92. When head portion 110 is moved to the position illustrated in FIG. 3 and in FIG. 5, the pivot shaft 98 may be removed from the tube 92.

The normal method of operation is as follows. Ordinarily, the front end of the vehicle would be raised up to facilitate the removal of the front wheels thereof so that the push arm brackets may be conveniently secured to the frame members. The push arm 32 would normally be connected to the push arm bracket 20 prior to the bracket 20 being secured to the frame member. Likewise, the push arm bracket would also be secured to the frame member 14. Initially, the push arms 36 and 36' would not ordinarily be connected to the push arms 32 until after the push arm bracket has been secured to the frame members. Supports 42 and 42' together with the structure secured thereto would then be secured to the truck bumper or the like by means of the frame angles 18 and 19. Push arms 36 would then be secured to the push arm 32 while the push arm 36 would be secured to the push arm positioned rearwardly thereof. The front wheels of the vehicle would then be replaced. The structure seen in the left hand side of FIG. 1 would ordinarily be left on the vehicle with only the blade structure 94 and its associated structure being disconnected during periods of non use.

When blade structure 94 is disconnected from the vehicle, a support block or the like would ordinarily be placed beneath frame means 96 to prevent the blade structure from tipping rearwardly. The blade structure 94 is connected to the vehicle by simply driving the vehicle forwardly so that the pivot shaft 98 is received by the tube 92. When pivot shaft 98 has been completely extended through tube 92, locking means 104 is moved to the position of FIG. 6 so that longitudinal movement of the pivot shaft 98 with respect to the cross beam 60 is eliminated. A suitable chain or the like would then be extended from the blade structure 94 through the sheave 50 so that the blade structure may be raised or lowered with respect to the vehicle. The apparatus used to raise and lower the blade structure does not form a part of this invention. When the blade structure is being used, the fact that the blade structure can rotate or pivot about pivot shaft 98 insures that the blade will automatically follow the contour of the road to insure an efficient snow removal operation as well as preventing damage to the associated structure. The design of the push arm brackets insures that stress will be distributed to the frame members over a large area to prevent damage to the equipment.

When it is desired to disconnect the blade structure from the vehicle, it is simply necessary to move the locking means to the position of FIG. 5. A support block or the like should be placed beneath frame means 96 to prevent rearward tipping thereof. The vehicle is then moved rearwardly so that pivot shaft 98 is withdrawn from tube 92. The frictional engagement of the O-rings with the side plates 38 and 38' prevents the cross beam 60 from pivoting during the periods that the blade structure 94 is disconnected from the vehicle. The O-rings maintain the cross beam 60 in the position that it was in when the blade structure was removed therefrom which results in tube 92 and pivot shaft 98 being properly aligned when it is desired to again connect the blade structure to the vehicle. However, the frictional engagement between th O-rings and the side plates is such that the cross beam 60 can pivot about bolts 78 and 90 when blade structure 94 is secured to the vehicle.

Thus it can be seen that an extremely durable, efficient and convenient snowplow has been provided which accomplishes at least all of the stated objectives.

Some changes may be made in the construction and arrangement of my snowplow without departing from the real spirit and purpose of my invention, and it is my intention to cover by my claims, any modified forms of structure or use of mechanical equivalents which may be reasonably included within their scope.

I claim:

1. In combination,
    a vehicle having rearward and forward ends and including first and second, spaced apart longitudinally extending frame members, said vehicle having first and second front wheel members positioned outwardly of said first and second frame members respectively,
    a first push arm means having rearward and forward ends and being connected at its rearward end to said first frame member and extending forwardly therefrom adjacent the said forward end of said vehicle,
    a second push arm means having rearward and forward ends and being connected at its rearward end to said second frame member and extending forwardly therefrom adjacent the said forward end of said vehicle,
    a cross beam means secured to the forward ends of said first and second push arm means and extending therebetween, said cross beam means including a first cross beam having an elongated opening formed therein, said opening having rearward and forward ends and having its axis normally disposed transversely to the longitudinal axis of said first cross beam and having its axis normally disposed parallel to the direction of travel of said vehicle, a material handling means having a pivot shaft secured thereto and extending rearwardly therefrom, said pivot shaft being removably and freely received by said opening in said first cross beam so as to permit said material handling means to freely rotate about the axis of said opening, a locking means for selectively maintaining said pivot shaft in said opening, means rotatably connecting said first cross beam about a horizontal axis to said push arm means and means connected to said material handling means and said cross beam means for rotating said material handling means with said cross beam about said horizontal axis.

2. The combination of claim 1 wherein first and second brackets are secured to the outer sides of said first and second frame members respectively, each of said brackets having first and second horizontally spaced apart plates secured to said frame member, a third plate secured to and extending between said first and second plates and being spaced from said frame member, said third plates of said first and second brackets having said first and second push arm means connected thereto respectively and extending forwardly therefrom.

3. The combination of claim 2 wherein each of said push arm means includes; first and second elongated push arms, said first push arm being pivotally connected to said third plate, said second push arm and extending forwardly therefrom, the forward end of said second push arm being secured at its forward end to said cross beam means.

4. In combination,
    a vehicle having rearward and forward ends and including first and second, spaced apart longitudinally extending frame members, said vehicle having first and second front wheel members positioned outwardly of said first and second frame members respectively,
    a first push arm means having rearward and forward ends and being connected at its rearward end to said first frame member and extending forwardly therefrom,
    a second push arm means having rearward and forward ends and being connected at its rearward end to said second frame member and extending forwardly therefrom,
    a cross beam means secured to the forward ends of said first and second push arm means and extending therebetween, said cross beam means including a first cross beam having an elongated opening formed therein, said opening having rearward and forward ends and having its axis normally disposed transversely to the longitudinal axis of said first cross beam,
    a material handling means having a pivot shaft secured thereto and extending rearwardly therefrom, said pivot shaft being removably rotatably received by said opening in said first cross beam whereby said material handling means is movable about the axis of said opening,
    a locking means selectively maintaining said pivot shaft in said opening,
    first and second plates being secured to the forward ends of said first and second push arm means respectively,
    said first cross beam being rotatably secured to and extending between said plates, said first cross beam having end portions which are parallel to and spaced inwardly from said plates, each of said end portions having an annular groove formed therein in the outer end thereof,
    and a resilient O-ring in each of said grooves and extending outwardly therefrom, said O-ring frictionally engaging the plate adjacent thereto to yieldably resist rotational movement of said first cross beam when said material handling means is detached therefrom.

5. The combination of claim 4 wherein each of said plates and said end portions have a bolt means extending therethrough, the tightening of said bolt means causing said O-rings to be compressed to increase the said yieldable resistance.

6. In combination,
    a vehicle having rearward and forward ends and including first and second, spaced apart longitudinally extending frame members, said vehicle having first and second front wheel members positioned outwardly of said first and second frame members respectively,
    a first push arm means having rearward and forward ends and being connected at its rearward end to said first frame member and extending forwardly therefrom,
    a second push arm means having rearward and forward ends and being connected at its rearward end to said second frame member and extending forwardly therefrom,
    a cross beam means secured to the forward ends of said first and second push arm means and extending therebetween, said cross beam means including a first cross beam having an elongated opening formed therein, said opening having rearward and forward ends and having its axis normally disposed transversely to the longitudinal axis of said first cross beam,
    a material handling means having a pivot shaft secured thereto and extending rearwardly therefrom, said pivot shaft being removably rotatably received by said opening in said first cross beam whereby said material handling means is movable about the axis of said opening, a locking means selectively maintaining said pivot shaft in said opening, said first cross beam being rotatably mounted about a horizontal axis, and resilient means engaging the ends of said first cross beam to yieldably resist rotation about said horizontal axis.

References Cited

UNITED STATES PATENTS

| | | | |
|---|---|---|---|
| 2,139,625 | 12/1938 | Pruss | 37—42R |
| 2,602,389 | 7/1952 | Markel | 172—275X |
| 2,710,464 | 6/1955 | Husting | 37—42 |
| 2,996,127 | 8/1961 | Dunn | 172—275 |
| 3,015,174 | 1/1962 | Zielinski | 172—804 |
| 3,150,884 | 9/1964 | Drott | 37—42R |
| 3,260,386 | 7/1966 | Engstrom | 172—275X |
| 3,343,850 | 9/1967 | Strauss et al. | 37—41UX |
| 3,400,767 | 9/1968 | Hermiz | 172—805 |
| 3,434,737 | 3/1969 | Bailey et al. | 172—275X |

J. REED FISHER, Primary Examiner

U.S. Cl. X.R.

37—42; 172—808